May 21, 1935.  F. H. OWENS  2,002,351
SOUND FILM APPARATUS
Filed June 24, 1932
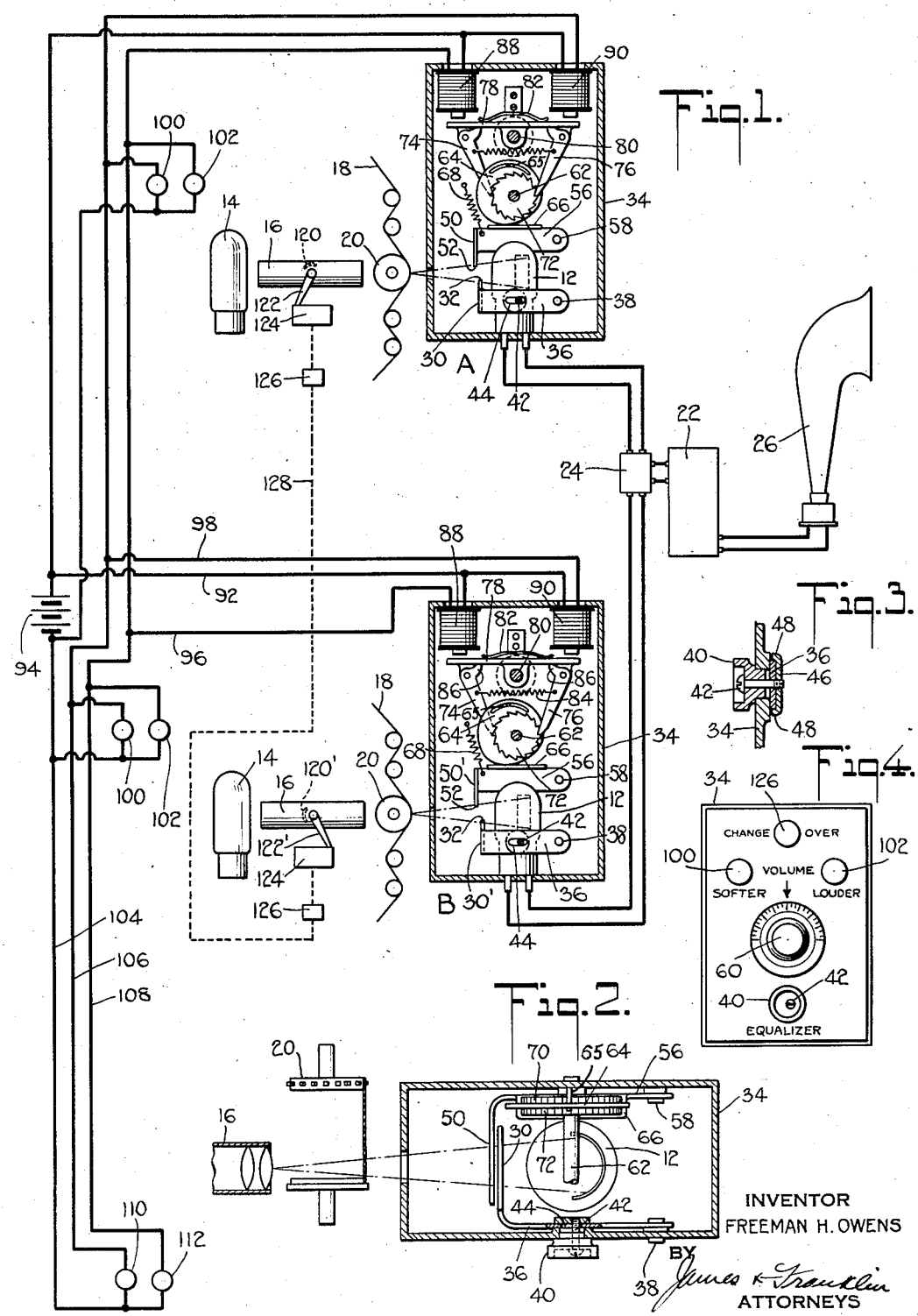
INVENTOR
FREEMAN H. OWENS
BY
James K. Franklin
ATTORNEYS Patented May 21, 1935

2,002,351

UNITED STATES PATENT OFFICE 2,002,351

SOUND FILM APPARATUS

Freeman H. Owens, New York, N. Y.

Application June 24, 1932, Serial No. 619,065

20 Claims. (Cl. 179—100.3)

This invention relates to sound film apparatus, and more particularly to wholly optical means for controlling the reproducing system of such apparatus.

The adjustment of the output of sound film apparatus is ordinarily accomplished by complex electrical circuits involving variable resistors or the like which prove noisy and unstable in use. One primary object of the present invention resides in the provision of optical means in contradistinction to the electrical means heretofore used for adjusting the output from such a sound film system. With this object in view I provide a shutter which is movable into the illumination system of the apparatus and which serves to appropriately vary the light falling on the photo-electric cell. Further objects of the present invention are to appropriately locate and arrange such a shutter for most satisfactory control of output, and to make the same equally adapted for use with film recorded by either the variable density or the variable area method. For this purpose I find it most satisfactory and convenient to locate the shutter between the film and the photo-electric cell so that the cut-off edge thereof may be moved into the already modulated diverging stream of illumination falling upon the cell. By moving the shutter in the direction of movement of the film, and by arranging the cut-off edge of the shutter at right angles to its direction of movement, the adjustment of output volume in no way affects the tone or fidelity of reproduction.

The sound film apparatus ordinarily comprises a plurality of reproducer systems one associated with each of the projectors and arranged for change-over in the conventional manner. Because of a number of variable factors, such as the sensitivity of the photo-electric cell, the brightness of the exciter lamp for a given voltage, the voltage applied to one exciter lamp relative to that applied to another due to non-uniformity in the transformers or supply circuits associated with said exciter lamps, and the like, it is found highly desirable to equalize the output volume from the several reproducer systems. This compensation when properly made avoids change in volume upon changing over from one projector to another at the end of each reel of film, and has heretofore been accomplished by variable resistances in complex electric circuits, with difficulties as already mentioned. In acordance with a further object of the present invention, I provide wholly optical equalization means for compensating for the variable factors already pointed out, and to the fulfillment of this object I provide independently adjustable shutters in each of the reproducer systems, and associate therewith manually adjustable means for causing a gradual movement of the shutter, together with locking means for fixedly locking the shutter in any desired position of adjustment.

Other objects of the present invention center about the provision of optical volume control means for controlling the actual loudness of sound during the projection of the film. The obtention of smooth, gradual, and quiet volume control has heretofore proved to be an exceedingly difficult problem. The control should be operable over a wide range and yet during its operation over this range should not result in change in the electrical characteristics of the sound circuits, leading to discrimination against certain frequencies with consequent distortion or loss of fidelity. Variable resistance units are notoriously noisy and troublesome when used in sensitive sound film circuits. They are also unstable in resistance value because of changes in the resistance material and changes in the contact obtained by the movable element. Further objects of the present invention are to obviate these difficulties, and to this end I find the use of an optical shutter such as has already been outlined highly desirable and extremely satisfactory. A more particularized object of my invention resides in the provision of control means for moving such a volume control shutter in such relation that the desired volume control may be obtained in accordance with a substantially uniform scale. A still further object of the present invention is to interconnect the optical volume control means of several reproducer systems so as to provide for simultaneous variation in volume of the several systems in response to a single or uni-control means. Still further objects of the present invention reside in the provision of electrical means for controlling or varying the positions of the volume control shutters, and more particularly to thereby make possible remote control of the volume, so that the sound output may be varied as desired by a listener favorably located in the theatre, rather than by the motion picture operator located in the projection booth. Such remote control as is ordinarily applied to the electrical reproduction system necessitates the installation of carefully shielded wiring extending to the remote control means, which wiring itself carries the sound modulated electrical energy. In accordance with a further object and feature of the present invention, this difficulty is overcome and the optical volume control means may be varied by remote control push-buttons or the like connected to the volume control means by ordinary inexpensive annunciator wiring.

The simultaneous variation of volume in several reproducer systems whether performed manually by resort to a graduated dial or scale, or perfomed automatically as by mechanical or electrical means, is obviously greatly facilitated if the sound output from each reproducer system can be compensated or adjusted to assume a fixed relation to the variable volume control means. It is a further object of the present invention to fulfil this desideratum, and for that purpose I find it both feasible and desirable to use the shutter or optical equalization means previously described together with the optical volume control means heretofore described. The compensation or equalization shutter is independently and fixedly adjustable at each of the reproducer systems and is preferably adjusted for uniform volume output when the volume control shutters or control means therefor are in similar physical positions. In accordance with another feature and object of the present invention the compensatory and volume control shutters in each unit are moved from opposite sides and in opposite directions into the path of illumination, thereby initially operating upon and cutting off the outer portions of the diverging beam of light falling upon the photo-electric cell.

Still another object of my invention is to avoid the noise, clicks, and other disadvantages attendant upon electrical change-over from one sound reproducing system to another, and with this object in view I provide the illumination systems with complete cut-off shutters, in accordance with the invention described in my Patent 1,862,062, issued June 7, 1932, and the cut-off shutters are then so interconnected that when one is opened the others are closed. The reproducer systems then include optical shutter means for equalization, optical shutter means for volume control, and optical shutter means for change-over, the equalization shutters being independently and fixedly adjustable, the volume control shutters being simultaneously and equally movable, and the change-over shutters being oppositely movable. With this arrangement the electrical circuits for sound reproduction may be permanently installed and fixed in optimum condition, and the exciter lamp and cell circuits may all be continuously left operatively in circuit, the entire control of the reproducer systems both as regards volume and change-over being accomplished by simple optical shutter means.

To the accomplishment of the foregoing and such other objects as will hereinafter appear, my invention consists in the sound film apparatus and the optical control elements thereof and their relation one to the other, as hereinafter are more particularly described in the specification and sought to be defined in the claims. The specification is accompanied by drawing in which:

Fig. 1 is a schematic diagram showing sound film equipment including two reproducer systems connected to power amplifier and loud speaker equipment;

Fig. 2 is a horizontal section explanatory of the shutter mechanism;

Fig. 3 is a vertical section showing a detail of the equalizer shutter; and

Fig. 4 is an outside elevation of the photo-electric cell housing showing the control devices.

Referring to the drawing and more particularly to Fig. 1 thereof, the sound film equipment shown includes first and second reproducer systems A and B each of which comprises a photo-electric cell 12, an illumination system including an exciter lamp 14, and a lens and optical slit system 16 for projecting a beam of light upon the photo-electric cell 12. A film 18 is guided over appropriate guide means 20 arranged to bring the sound track on the film across the path of illumination in order to modulate the light falling upon the photo-electric cell.

The modulated electrical energy from the cell, after preliminary amplification in a local photo-electric cell amplifier, not shown, should such amplification prove desirable or necessary, is fed to a common power amplifier 22, preferably after passing through an appropriate tone control 24, and the highly amplified modulated energy is then supplied to appropriate loud speaker equipment 26 which may be located behind or alongside of the motion picture screen in the conventional manner.

With electrical volume control circuits of the ordinary type, it is customary to control the volume of the sound energy after the several photo-electric cell circuits have been combined into a single amplifier circuit. If the energy output from one of the cells is not equal to that from another of the cells, there will be a distinct change in volume when the change-over from one reproducer system to another is made. Such differences in cell output frequently arise due to a number of factors, such as differences or changes in the sensitivity of the photo-electric cells, differences or changes in the light intensity or brightness of the exciter lamps, differences in the voltages applied to the exciter lamps, and so on. In accordance with the present invention the photo-electric cell outputs may be equalized by fixed adjustable optical shutters indicated at 30 and 30'. The shutter is preferably arranged to move in the direction of movement of the film, which ordinarily is vertical, and the cut-off edge 32 preferably extends horizontally or at right angles to the direction of movement of the shutter. The shutter is arranged to move into the path of illumination between the lamp 14 and the cell 12, and is preferably located between the film 18 and the lamp 12 so that it may be moved into the diverging beam of light falling upon the photo-electric cell. With such an arrangement the adjustment of output may be made gradually and sensitively because a rather wide beam of light is being dealt with, and the adjustment is equally well applicable to films recorded by the variable area or variable peak method, as well as the variable density method.

The shutter 30 preferably is located within the photo-electric cell housing 34, as shown, and conveniently consists of a piece of sheet material bent at right angles to form the shutter portion 30 and a control portion 36, as is most clearly shown in Fig. 2. The control portion 36 is pivoted at 38 for oscillation in a vertical plane, and the desired movement may be obtained by a manually adjustable knob 40 rotatable in the wall of housing 34 and carrying an eccentrically mounted locking screw and crank 42 which passes through a horizontal slot 44 in the control arm 36. As is best shown in Fig. 3, the threaded portion of screw 42 mates with a threaded nut 46 having top and bottom flanges 48 encompassing the upper and lower edges of the control arm 36. It will be evident that rotation of the knob 40 causes rotation of crank 42 and consequent oscillation of the shutter about the fixed pivot 38, and that tightening of the screw 42 after adjustment locks the shutter in desired position. It will further be evident that each of the shutters 30 and 30' is adjustable wholly independently of the other, in consequence of which these shutters may be employed to equalize the output of the reproducer systems A and B.

With the arrangement as so far described, the volume control actually employed during the projection of pictures may be of any desired type, as, for example, an electrical resistance circuit system associated with the tone control 24. However, such systems are noisy and troublesome in operation and in many cases result in a change of tone or loss of fidelity upon change in volume. In accordance with the present invention such electrical volume control of the modulated sound energy may be dispensed with and an optical control substituted therefor. In the specific case here illustrated the desired volume control is obtained by means of shutters 50 and 50' which, like the shutters 30 and 30', are preferably located between the film 18 and the cell 12; are preferably moved vertically or, in more general terms, in the direction of movement of the film; and preferably have leading or cut-off edges 52 which extend horizontally or, in more general terms, which extend at right angles to the direction of movement of the film and the shutter. Furthermore, if the reproducer systems are provided not only with the volume control shutters 50, but also with equalizing shutters 30, it is then further desirable that the volume control shutter be located on the opposite side of the path of illumination relative to the equalization shutters, or, in the specific case here shown where the equalization shutters are located beneath the path of illumination, the volume control shutters are located above the path of illumination.

The volume control shutter 50 may be conveniently constructed from a piece of sheet metal bent at right angles to form a shutter portion 50 and a control arm portion 56 pivoted on a stationary bearing 58. The control arm 56 may be moved by any appropriate form of control means as, for example, a control knob and crank pin arrangement such as was illustrated in connection with the equalization shutters 30. However, it is desirable that the volume control manipulation follow a substantially uniform scale, and with this object in view I employ an arrangement including means movable in accordance with a uniform scale, such as the manual control knob 60 shown in Fig. 4, or the electrically operated ratchet wheel shaft 62 shown in Figs. 1 and 2, and I interconnect these movable means with the shutter 50 by means so designed as to obtain substantially uniform changes in volume in response to commensurate changes of the dial 60 or shaft 62. The interconnecting means in the present case consists of a cam 64 secured to the shaft 62. The shutter arm 56 is provided with a cam follower surface 66 which may be formed integrally with the arm 56 as shown. The cam and cam follower surfaces are kept in contact by resilient means such as the tension spring 68. The cam 64 is laid out in accordance with empirical determinations in order to obtain the desired linear relation between the volume control shaft 62 and the output of the reproducer system. It will be appreciated that the sound output is not strictly proportional to the movement of shutter 50, the sound cut-off becoming more rapid as the shutter descends but that by the interposition of means such as the cam 64 designed to produce a non-linear movement of the shutter, the non-linearities may be balanced against one another so as to obtain the desired substantially uniform volume control response.

The volume control shaft 62 preferably extends across the housing 34, so that the dial 60 may be located on the outside of the housing and thereby made accessible along with the equalizer knob 40, this arrangement being best shown in Fig. 4. The dial 60 and a portion of shaft 62 have been cut away in Fig. 2 in order to more clearly show the control means for the equalizer shutter 30. With manual control means it is necessary to keep the adjustment of volume the same on each of the reproducer systems, and this may be done with the aid of the calibration on the dial. However, if desired the dial 60 on each of the reproducer systems, or the shafts 62 may be interconnected in any desired manner for simultaneous movement or control as, for example, by the use of a shaft extending directly between the two projectors.

In lieu of the manually operable dial or, if desired, in addition thereto, the volume control may be obtained electrically, and such an electrical arrangement possesses the advantage of making possible remote control of the volume. In the present case the shaft 60 is provided with a pair of ratchet wheels 70 and 72 the teeth of which are oppositely disposed. Ratchet wheel 70 is arranged for engagement by a pawl 74, while ratchet wheel 72 is arranged for engagement by a pawl 76. The pawls 74 and 76 are secured to opposite ends of a rockable armature 78 pivoted at 80 and normally held in horizontal position by a leaf spring 82. The pawls 74 and 76 are resiliently drawn together by a tension spring 84, but their inward movement is limited to the amount shown in the drawing by stops 86 which bear against the lower side of the armature 78. A pair of magnets 88 and 90 are located above the opposite ends of the armature 78, so that upon energization of magnet 88 the armature is rocked in a clockwise direction, thereby causing pawl 76 to move ratchet 72 in a clockwise direction. Meanwhile, pawl 74 slides freely past the teeth of ratchet wheel 70 and is ineffective to move the same even upon return movement of the armature 78 to its mid position, owing to the fact that the pawl is unable to move into engagement with the ratchet wheel because of the stop 86. Similarly, upon energization of the magnet 90 the armature 78 is oscillated counter-clockwise, thereby causing pawl 74 to move ratchet wheel 70 in a counter-clockwise direction, the pawl 76 meanwhile becoming ineffective even upon restoration of the armature 78 to its mid position, by reason of its associated stop 86. The magnets 88 and 90 may be energized through a common or return wire 92 connected to a battery or other source of electrical energy 94, while either of the magnets may be selectively energized through conductors 96 and 98 respectively, which in turn may be closed by depression of either of the push-buttons 100 or 102 which may be appropriately designated for increase and decrease of sound output. Upon depression of either button the sound output will be modified by an amount corresponding to a single tooth on the ratchet wheels, and the volume will remain at this new value regardless of how long the button is pressed. Only by intentionally releasing and again depressing the button will the volume be altered by an additional step. In this manner a gradual change in volume is obtainable without danger of hunting caused by excessively changing the volume when manipulating the controls therefor. The total cam motion is preferably limited, as by the fixed stops 65 projecting through slots in the cams, to prevent over-travel of the cam by operation of the push-buttons. Either the manual dial or the push-button system is here to be used. If both are used, then means should be added for making the ratchet system ineffective when using the dial.

The primary advantage of the electrical control means as aforesaid, resides in the convenience with which remote control may be provided. Thus in the present case a common conductor 104 and two control conductors 106 and 108 may be extended to control buttons 110 and 112 located at any convenient or desirable point in the theatre where an observer may vary the volume to its most preferable value. It should also be noted that with the electrical control means the desired simultaneous or uni-control of the volume in the several reproducer systems may readily be obtained by electrical rather than mechanical interconnection of the reproducer systems. This is evident from the drawing in which the magnetic control means for reproducer system A correspond to the magnetic control means for reproducer system B, both systems being wired to the common source 94, and either or both systems being provided with local push-button control means 100 and 102. It should be kept in mind that the wiring for the electrical control means here shown may be of the ordinary inexpensive annunciator type and dispenses with the necessity for an expensive installation of well-shielded wiring such as is needed when the sound modulated energy is itself brought to a control booth in the theatre.

The reproducer systems must be arranged for change-over from one to another, and this change-over preferably and most conveniently takes the form of an optical cut-off shutter system such as I have described in my said patent before referred to. As is there explained a sound change-over obtained by switching the audio frequency electrical circuits results in clicks or other noise. A change-over obtained by opening or closing the exciter lamp circuits is also undesirable and, among other things, leads to shortening the life of the exciter lamp relative to its useful life when left continuously in circuit. These and numerous other disadvantages may be overcome by optically shuttering the illumination system, and for this purpose a cut-off shutter may be located anywhere in the illumination system between the exciter lamp and the photo-electric cell. In the present case I show such a shutter at 120 or 120' located in the optical system 16. The shutter 120 is in its open position, thereby making the reproducer system A effective, whereas the shutter 120' is in its closed position, thereby making the reproducer system B ineffective. Shutters 120 and 120' are moved by control arms 122 and 122' themselves actuated by an appropriate solenoid system schematically indicated at 124, the solenoid system being controlled as desired by switching mechanisms schematically indicated at 126, said switch mechanism being interconnected by appropriate wiring schematically shown by the broken line 128. The switching and interconnecting wire systems may be of any conventional type, preferably of the kind providing for actuation of both the solenoids 124 upon change of either of the switches 126, the solenoids being, of course, energized in opposite directions, so that whenever one of the shutters is closed the other is simultaneously opened. The details of the wiring system are not set forth, first, because they may be of conventional type; and secondly, because an appropriate system for the purpose is described in my aforesaid patent and also in my copending application Ser. No. 611,772, filed May 17, 1932.

The push-buttons 100 and 102 for volume control and the switch means 126 for change-over may be and preferably are localized at each of the reproducer systems, thereby making possible control of both systems by an operator at either system. These elements may be located directly on the photo-electric cell housing 34, as is most clearly shown in Fig. 4.

It is believed that the mode of constructing and using my improved sound film apparatus, as well as the many advantages thereof, will, for the most part, be apparent from the foregoing detailed description. Adjustment of the output of the photo-electric cell is obtainable without any change in electrical circuits and wholly by optical means. This adjustment of output may be employed either for equalization of the cell outputs of several reproducer systems, or for volume control, or for both equalization and volume control. The optical control set forth is applicable to any type of film recording such as the variable density or the variable area type. The control obtained is gradual, noiseless, and results in no distortion of tone or frequency discrimination. The fixed adjustable nature of the equalization shutters makes possible and facilitates uni-control of the volume of several reproducer systems in accordance with a predetermined scale. This scale may itself be made linear or uniform. The volume control may be manual with or without interconnection for uni-control, or may be electrical with not only interconnection for uni-control, but remote connection for remote control. The remote control obtained necessitates only inexpensive annunciator wiring and discourages overadjustment or hunting when changing the volume. Not only equalization and volume control, but also change-over may be provided for by optical shutter means, and in such case the change-over or cut-off shutters are preferably interconnected for opposite movement in order to make one reproducer system effective when the other is ineffective, and vice versa. The complete sound film apparatus with wholly optical control makes it possible to install and maintain audio frequency electrical circuits which are absolutely stable and fixed in nature, and which require no constant variation or adjustment, thereby simplifying the circuits and making the same more trouble-free and fool-proof, and at the same time avoiding the noise and instability caused by the use of variable resistances, as well as the changes in fidelity caused by most if not all electrical types of volume control.

It will be evident that any of the three shutter systems described may be used independently of the others as well as in combination with one or more of the others. It will also be appreciated that the volume control and equalization shutters may, if desired, be combined into one, in which case it is desirable to provide for mechanical fixed adjustment means between the volume control dial and the shutter itself. It will also be understood that numerous forms of fixedly adjustable mechanism may be employed for moving the equalization shutters, and that numerous forms of locally controlled or remotely controlled mechanism may be used for moving the volume control shutters. It will also be understood that the change-over shutters may be located anywhere in the illumination system other than in the position shown, and that an output varying shutter in the form of an iris diaphragm, for example, may be located anywhere in the illumination system. These and many other variations may be made, and it will therefore be apparent that while I have shown and described my invention in preferred form, many changes and modifications may be made in the structure disclosed, without departing from the spirit of the invention, defined in the following claims.

I claim:

1. Sound film apparatus comprising a photo-electric cell, an illumination system therefor, means to guide a film between the illumination system and the photo-electric cell, a perfectly opaque shutter so mounted as to be movable gradually into the path of illumination, and means to adjust and to hold the same fixedly in position of adjustment in order to provide optical means for determining the normal volume of the sound produced by said apparatus, and thereby to obviate the disadvantages attendant upon volume control by changes in the electrical circuits.

2. Sound film apparatus comprising a photo-electric cell, an illumination system therefor, means to guide a film between the illumination system and the photo-electric cell, an opaque shutter having a transverse cut-off edge so mounted as to be movable in the direction of movement of the film into the path of illumination between the film and the photo-electric cell, and means to adjust and to hold the same fixedly in position of adjustment in order to provide means for determining the normal volume of the sound produced by said apparatus.

3. Sound film apparatus comprising a photo-electric cell, an illumination system therefor, means to guide a film in a vertical direction between the illumination system and the photo-electric cell, an opaque shutter having a horizontal cut-off edge and so mounted as to be movable vertically into the path of illumination between the film and the photo-electric cell, and means to adjust and to hold the same fixedly in position of adjustment in order to provide means for determining the normal volume of the sound produced by said apparatus regardless of whether the recording is of the variable density or variable area type.

4. Equalizing means for sound film apparatus including a plurality of reproducer systems arranged for change-over, each of said systems comprising a photo-electric cell, an illumination system therefor, means to guide the film between the illumination system and the photo-electric cell, an opaque shutter so mounted as to be movable into the path of illumination, manually adjustable means for causing movement of the shutter, and means for locking the shutter in a desired position of adjustment, whereby the volume from the several reproducer systems may be equalized to compensate for variations in cell sensitivity, lamp brightness, voltage, and the like.

5. Equalizing means for sound film apparatus including a plurality of reproducer systems arranged for change-over, each of said systems comprising a photo-electric cell, an illumination system therefor, means to guide the film between the illumination system and the photo-electric cell, an opaque shutter having a transverse cut-off edge movable in the direction of movement of the film into the path of illumination between the film and the photo-electric cell, manually adjustable means for causing movement of the shutter, and means for locking the shutter in a desired position of adjustment.

6. Volume control means for sound film reproducing apparatus comprising a photo-electric cell, an illumination system therefor, means to guide the film between the illumination system and the photo-electric cell, an opaque shutter movable into the path of illumination, adjustable means for causing movement of said shutter and for holding the same fixedly in position of adjustment, and mechanical means so interconnecting the adjustable means and the shutter for non-linear response as to obtain the desired volume control in accordance with a substantially uniform scale, the said optical volume control means avoiding the disadvantages of variable resistance circuits or like electrical means.

7. Volume control means for sound film apparatus comprising a photo-electric cell, an illumination system therefor, means to guide the film in a vertical direction between the illumination system and the photo-electric cell, an opaque shutter having a horizontal cut-off edge movable vertically into the path of illumination between the film and the photo-electric cell, adjustable means for causing movement of said shutter and for holding the same fixedly in position of adjustment, and cam means interconnecting the adjustable means and the shutter and so shaped as to obtain the desired volume control in accordance with a desired volume scale.

8. Volume control apparatus for sound film equipment including a plurality of reproducer systems each comprising a photo-electric cell, an illumination system therefor, means to guide the film between the illumination system and the photo-electric cell, an opaque shutter having a transverse cut-off edge movable into the path of illumination in the direction of movement of the film between the film and the photo-electric cell, and adjustable means for moving the shutter and for holding the same fixedly in position of adjustment, and means interconnecting the adjustable means on each of the systems for simultaneous control of the volume of the several reproducer systems.

9. Volume control apparatus for sound film equipment including a plurality of reproducer systems each comprising a photo-electric cell, an illumination system therefor, means to guide the film between the illumination system and the photo-electric cell, an opaque shutter having a transverse cut-off edge movable into the path of illumination in the direction of movement of the film between the film and the photo-electric cell, remote control means for establishing the normal position of the shutters, and wiring interconnecting the control means and both of said reproducer systems for simultaneous and equal variation of the shutters.

10. Volume control apparatus for sound film equipment including a plurality of reproducer systems each comprising a photo-electric cell, an illumination system therefor, means to guide the film in a vertical direction between the illumination system and the photo-electric cell, an opaque shutter having a horizontal cut-off edge movable vertically into the path of illumination between the film and the photo-electric cell, and remote control means for establishing the normal position of the shutters, said means including electromagnetic devices for moving the shutters progressively step by step in either direction and telemetric means of the ordinary annunciator type providing push-button control at any desired location in the theatre for simultaneous and equal variation of the shutters in the several reproducer systems.

11. Sound film apparatus comprising a photo-electric cell, an illumination system therefor, means to guide the film between the illumination system and the photo-electric cell, a plurality of opaque shutters each movable into the path of illumination, adjustable means for moving one of said shutters, locking means for locking said shutter in adjusted position, and adjustable volume control means for moving the other of said shutters and for holding the same in position of adjustment.

12. Sound film apparatus comprising a photo-electric cell, an illumination system therefor, means to guide the film between the illumination system and the photo-electric cell, a plurality of opaque shutters each having a transverse cut-off edge movable in the direction of movement of the film into the path of illumination between the film and the photo-electric cell, said shutters being movable from opposite sides into the path of illumination in opposite directions, adjustable means for moving one of said shutters, locking means for locking said shutter in adjusted position, and adjustable volume control means for establishing the normal position of the other of said shutters.

13. Sound film apparatus comprising a photo-electric cell, an illumination system therefor, means to guide the film in a vertical direction between the illumination system and the photo-electric cell, a plurality of opaque shutters each having a horizontal cut-off edge movable vertically into the path of illumination between the film and the photo-electric cell, one of said shutters being movable upwardly into the path of illumination and the other of said shutters being movable downwardly into the path of illumination, adjustable means for moving one of said shutters, locking means for locking said shutter in adjusted position, adjustable volume control means for moving the other of said shutters, and means so interconnecting said adjustable means and said shutter as to provide the desired volume control changes in accordance with a substantially uniform scale.

14. Sound film apparatus comprising a photo-electric cell housing, a photo-electric cell mounted therein, an opaque shutter movably mounted on said housing in front of said cell, manually operable means to move the shutter partially into the illumination path, and means to lock the shutter fixedly in adjusted position in order to cut off part of the illumination reaching the cell.

15. Sound film apparatus comprising a photo-electric cell housing, a photo-electric cell mounted therein in upright position, an opaque shutter having a horizontal cut-off edge positioned in front of said cell, an arm extending horizontally from said shutter and pivoted on the cell housing, whereby said shutter is movable vertically into the path of illumination reaching the cell, a manually operable adjusting knob on the outside of said cell housing, means eccentrically related to said knob for moving the shutter, and lock means for locking the knob in adjusted position.

16. Volume control means for sound film reproducing apparatus comprising a photo-electric cell housing, a photo-electric cell therein, an opaque shutter in front of said cell and movable into the path of illumination reaching the cell, a cam rotatably mounted in said housing and bearing against said shutter to vary the position thereof, and control means outside the housing for rotating the cam.

17. Volume control means for sound film reproducing apparatus comprising a photo-electric cell housing, a photo-electric cell therein, an opaque shutter in front of said cell and movable into the path of illumination reaching the cell, a cam rotatably mounted in said housing and bearing against said shutter to vary the position thereof, a ratchet wheel operatively connected to said cam, a pawl for moving said ratchet wheel, an electro-magnet for actuating said pawl, and appropriate circuit means for energizing said magnet.

18. Volume control apparatus for sound film equipment including a plurality of photo-electric cell housings associated with a plurality of projectors for change-over, each of said housings including a photo-electric cell mounted therein, an opaque shutter movably mounted thereon in front of the cell, a cam rotatable within said housing and cooperating with said shutter to move the same, a ratchet wheel operatively connected to said cam, a pawl for moving said ratchet wheel with a step by step movement, and an electro-magnet for actuating the pawl, and appropriate electrical circuit means for simultaneously energizing each of said magnets in order to simultaneously and similarly change the shutter position in each of the cell housings.

19. Sound film apparatus comprising a photo-electric cell housing, a photo-electric cell vertically mounted therein, a plurality of opaque shutters each having a horizontal cut-off edge movable vertically into the path of illumination of the cell, one of said shutters being mounted on the housing at the lower portion of the cell and being movable upwardly into the path of illumination, the other of said shutters being mounted on said housing near the upper portion of the cell and being movable downwardly into the path of illumination, manually adjustable means for moving one of said shutters, additional locking means to lock said shutter in adjusted position, a cam for moving the other shutter, and control means outside the housing for rotating the cam.

20. Sound film apparatus comprising a photo-electric cell housing, a photo-electric cell vertically mounted therein, a plurality of opaque shutters each having a horizontal cut-off edge movable vertically into the path of illumination of the cell, one of said shutters being mounted on the housing at the lower portion of the cell and being movable upwardly into the path of illumination, the other of said shutters being mounted on said housing near the upper portion of the cell and being movable downwardly into the path of illumination, manually adjustable means for moving one of said shutters, additional locking means to lock said shutter in adjusted position, a cam for moving the other shutter, a ratchet wheel operatively connected to the cam, a pawl for moving the ratchet wheel step by step, a magnet for actuating the pawl, and appropriate electrical circuit means for energizing the magnet.

FREEMAN H. OWENS.